March 12, 1935.  L. J. ROSA ET AL  1,993,813
VEHICLE WHEEL RIM CONSTRUCTION
Filed July 22, 1931  4 Sheets-Sheet 1

INVENTORS
Leonard J. Rosa
Charles S Ash
BY
ATTORNEYS

March 12, 1935.  L. J. ROSA ET AL  1,993,813
VEHICLE WHEEL RIM CONSTRUCTION
Filed July 22, 1931   4 Sheets-Sheet 2
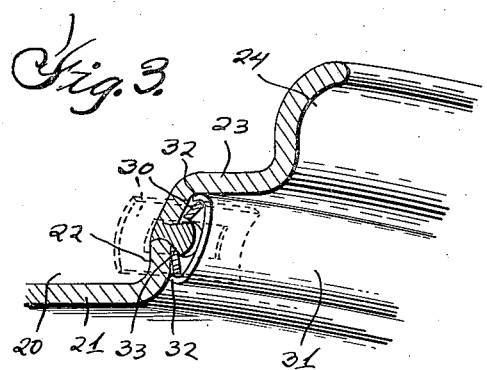
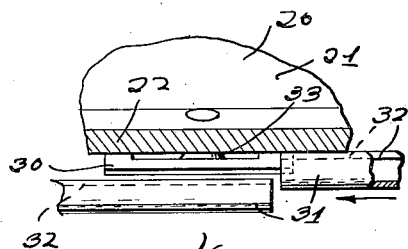
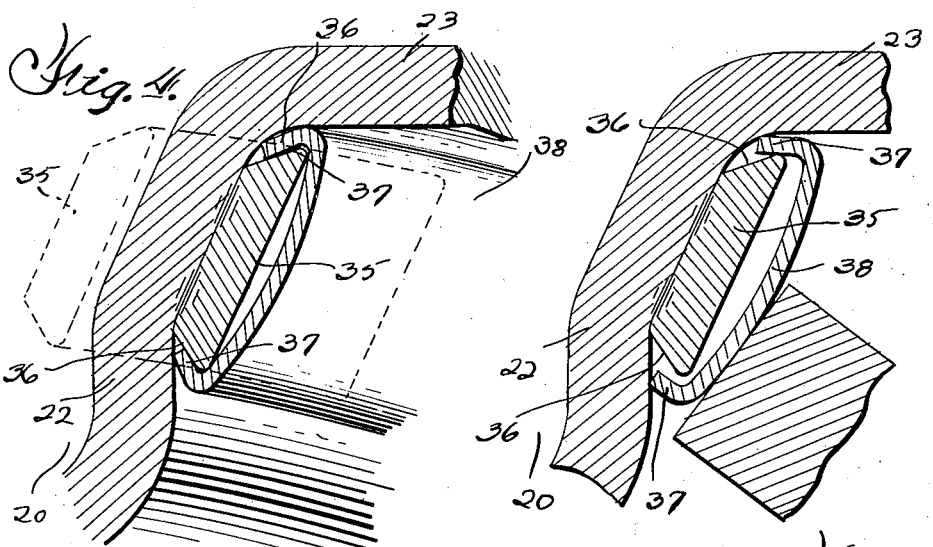
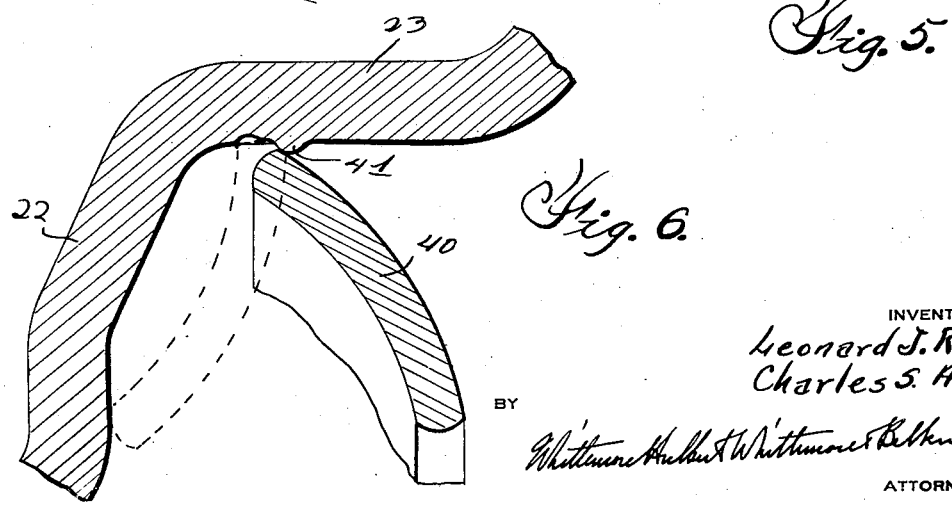
INVENTORS
Leonard J. Rosa
Charles S. Ash
BY
ATTORNEYS

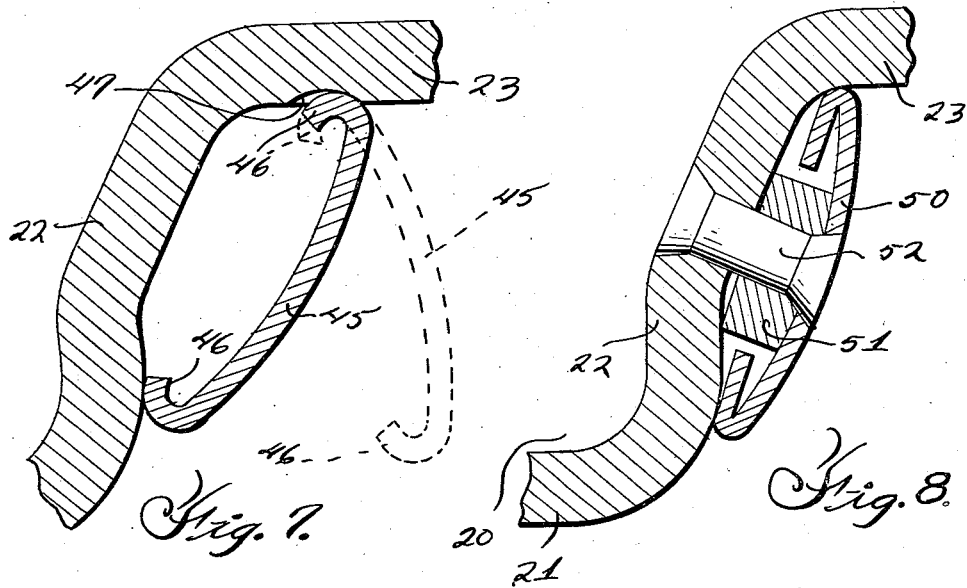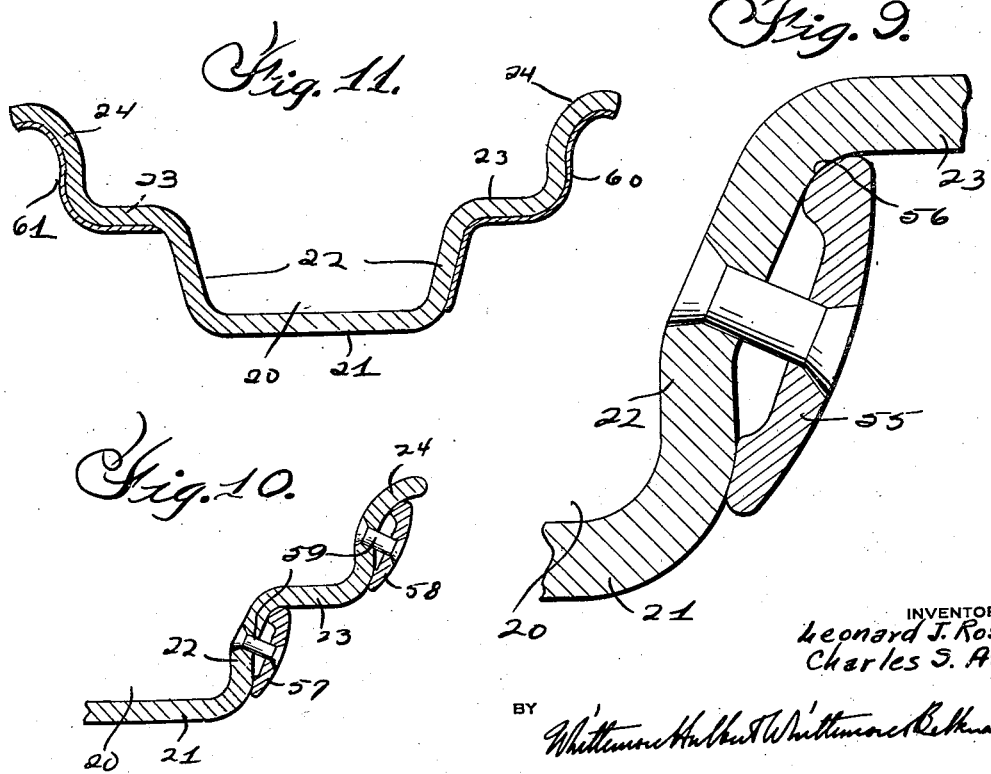

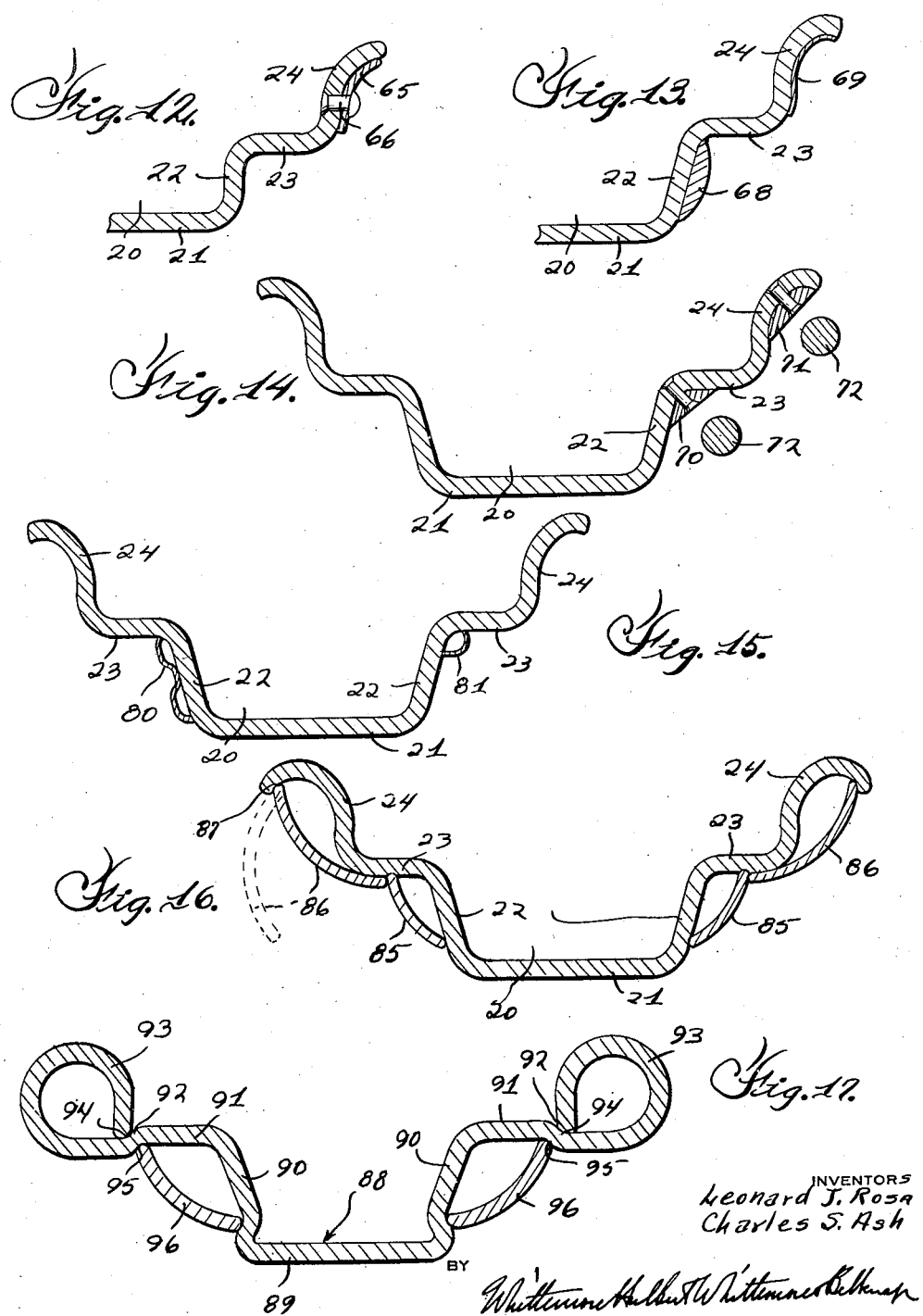

Patented Mar. 12, 1935

1,993,813

UNITED STATES PATENT OFFICE 1,993,813

VEHICLE WHEEL RIM CONSTRUCTION

Leonard J. Rosa, Detroit, and Charles S. Ash, Birmingham, Mich., assignors to Kelsey-Hayes Wheel Corporation, Detroit, Mich., a corporation of New York Application July 22, 1931, Serial No. 552,498

10 Claims. (Cl. 41—10)

This invention relates generally to vehicle wheel rims and has particular reference to pneumatic tire carrying rims of the drop center type.

While vehicle wheel drop center rims possess many advantageous features over rims of other types, nevertheless, they have one serious objection in that they tend to detract from the general appearance of the wheel. The above objection is due principally to the fact that the side wall portions of drop center rims present a wide more or less uniformly finished surface to the observer which appears accentuated in a small diametered wheel.

The present invention contemplates eliminating the foregoing objection by providing means associated with at least the front sides of rims of the above type tending to provide some relief for the expanse of uniformly finished surface above referred to and thereby appreciably enhance the general appearance of the wheel.

Another advantageous feature of this invention consists in the provision of means of the type specified above which, in addition to enhancing the general appearance of the rim, also serves to reinforce the side wall portions of the latter and thereby provide for obtaining a stronger and more durable construction.

A further object of the present invention consists in the provision of an improved drop center rim having means for preventing spreading of the tire retaining flanges thereof in the event the latter are relied upon to support the weight of the vehicle.

The foregoing as well as other objects will be made more apparent as this description proceeds, especially when considered in connection with the accompanying drawings, wherein:

Figure 3 is a view similar to Figure 2 showing a slightly modified form of construction;

Figure 3A is a fragmentary sectional plan view of the construction shown in Figure 3 illustrating one method of attaching the rings to the rims;

Figure 4 is also a sectional perspective view showing a different form of construction;

Figure 5 is a fragmentary sectional view illustrating the manner in which the ring illustrated in Figure 4 may be attached to the rim;

Figure 6 to 16, inclusive, are cross-sectional views, each showing a modified form of the present invention;

Figure 17 is a sectional view similar to Figure 6 illustrating the appearance ring as applied to a slightly modified form of drop center rim.

Figure 1:
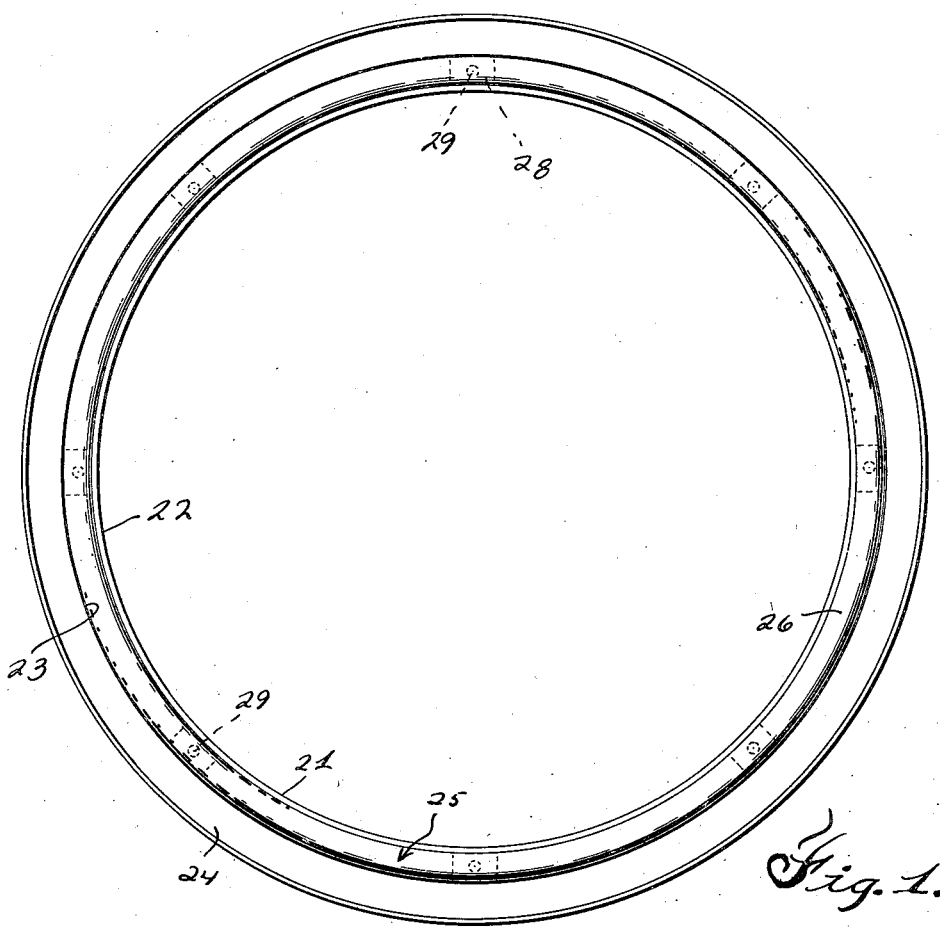
Figure 1 is a front side elevational view of a drop center rim equipped with means for enhancing the general appearance of the rim.
Figure 2:
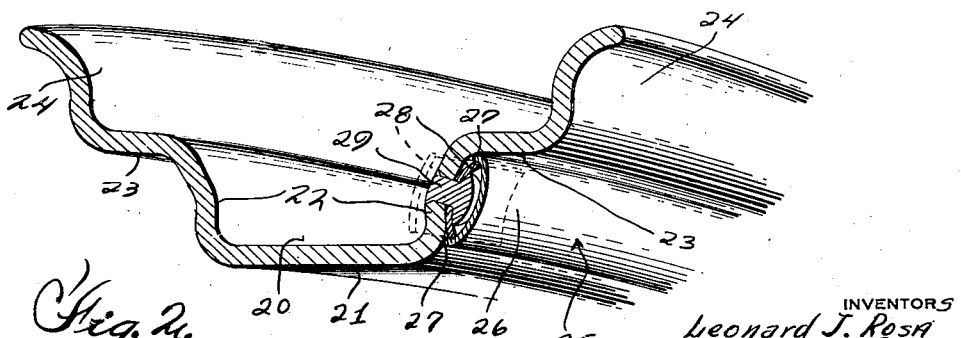
Figure 2 is a fragmentary cross-sectional perspective view through the rim shown in Figure 1.

For the purpose of illustration, the various modifications of the invention featured in Figures 1 to 16, inclusive, are shown as employed on vehicle wheel rims of the drop center type. The drop center rim selected for the purpose of illustration is best shown in Figures 1 and 2 and is provided with an annular well or recess 20 having a base portion 21 and having wall or flange portions 22 extending substantially radially outwardly from the front and rear edges of the base 21. The wall portions 22 are provided at the free ends thereof with laterally outwardly extending annular shoulders 23 terminating in radially outwardly extending tire retaining flanges 24.

As will be readily apparent from Figures 1 and 2, the flange portions 22 and 24 of the drop center rim cooperate in front elevation to form in effect a substantially continuous or uniform surface, which, when combined with the front side of the portions of the tire extending radially beyond the tire retaining flange 24, presents an uninterrupted surface of great width as compared to the diameter of the wheel which detracts materially from the general appearance of the wheel. In order to relieve the uniform surface hereinbefore discussed and accordingly enhance the appearance of the drop center rim, suitable ornamental rings may be secured to either or both the flange portions 22 and 24 at the front sides thereof.

In Figures 1 and 2 of the drawings, we contemplate securing the desired appearance of the rim by securing a ring 25 to the front face of the wall or flange portion 22 on the rim. The ring 25 may either be continuous or transversely split and is formed with an ornamental appearance. The ornamental qualities may be secured in many different ways, such, for example, as by forming the ring of rolled steel and chrome plating the same or by painting or otherwise decorating the front face of the ring to provide the same with a finish readily distinguishable from the finish of the rim. It will further be apparent that if desired, the ring may also be formed of stainless steel, duralumin or any other metal having decorative qualities.

In any event, the ring 25 illustrated in Figure 1 is provided with a forwardly bowed front wall 26 terminating at the inner and outer edges thereof in rearwardly extending annular flanges 27 adapted to be engaged by fastener elements 28 which in turn are rigidly secured to the wall portion 22 at circumferentially spaced points. The fastener elements 28 are in the form of rectangular-shaped washers having the central portions thereof rigidly secured to the wall or flange portions 22 by any suitable means such as the rivets 29 and having the inner and outer edges thereof bent forwardly to asume a spaced relationship to the front face of the wall portions 22. The arrangement is such that in the event the ornamental ring 25 is formed continuous, the same may be snapped over the washers to provide an interlocking connection therebetween. On the other hand, if the ring is transversely split, the same may be in effect threaded upon the washers. Irrespective of the manner in which the ring is secured in place and of the particular finish of the ring, it will be apparent that the same conceals the fastener elements 28 and offers some relief to the observer. The above construction, in addition to possessing ornamental qualities, incidentally serves as a reinforcement for the rim.

In Figure 3, we have shown a slightly modified form of construction which differs from the one previously described in that the washers 30 are in effect loosely riveted to the wall portions 22 of the drop center rim. The ornamental ring, on the other hand, is transversely split and is secured in place by threading the same over the washers 30 as illustrated in Figure 3A which, as in the first described form of the invention, are arranged at circumferentially spaced points about the rim. As will be observed from Figure 3, the above construction is such that when the ornamental ring 31 is in assembled relation with the rim, the washers 30 are held by the marginal flanges 32 on the ring in wedging engagement with the tapered portions 33 of the rivets.

In the modification of the invention illustrated in Figures 4 and 5, the washers or ring fastening devices 35 are welded or otherwise united at circumferentially spaced points to the front face of the flange portions 22. The washers 35 are provided with undercut portions 36 at the inner and outer edges thereof forming tapering shoulders for engaging the inner and outer marginal flanges 37 on the ornamental ring 38. The ornamental ring 38 in the present instance, is preferably continuous and is secured to the washers 35 in the manner suggested in Figure 5 of the drawings. As will be observed from Figure 5, the marginal flanges 37 extending rearwardly from the inner and outer edges of the ring are initially spaced apart a sufficient distance to freely receive therebetween the washers 35. After the ring has been extended over the washers in the manner suggested in Figure 5, pressure is applied to the ring from the front side thereof wedging the flanges into engagement with the adjacent portions of the rim and thereby bending the flanges toward each other into engagement with the tapered undercut walls 36 of the washers.

Figure 6 illustrates another modified form of the invention differing from the previously described forms in that separate fastening means for the ornamental ring is eliminated. In other words, the ring 40 illustrated in Figure 6 is capable of being secured to the wall portion 22 of the drop center rim without the assistance of any securing means and, as shown, is transversely curved so that when in assembled relation with the rim, it serves to impart a neat and pleasing appearance to the latter. In order to provide for securing the ornamental ring to the drop center rim in front of the wall portion 22, the inner surface of the annular shoulder 23 is provided with an inwardly extending bead 41 which may be either continuous or intermittent, whichever is desired. The bead 41 is spaced a predetermined distance laterally outwardly from the wall or flange portions 22 of the rim and is adapted to form an abutment for the upper edge of the ring when the latter is in assembled relation with the rim.

As previously stated, the rim 40 is transversely curved and as will be apparent from the full line position of the ring illustrated in Figure 6, the latter is so formed that prior to securing the same to the rim, the inner edge thereof assumes a position substantially in advance of the outer edge. When it is desired to assemble the ornamental ring to the rim, the peripheral edge thereof is engaged with the bead 41 in rear of the same so that the ring assumes the full line position illustrated in Figure 6. When the ring is in this latter position, pressure is exerted upon the inner edge portion thereof tending to fulcrum the ring about the bead 41 and move the said inner edge of the ring rearwardly past the peripheral edge of the same. As the inner edge portions of the ring are moved rearwardly past the peripheral edge of the ring, the former will be snapped rearwardly into engagement with the wall portion 22 to assume the position illustrated by the dotted lines in Figure 6. The foregoing affords a relatively simple and experient manner for securing the appearance ring in position and moreover, serves as an appreciable reinforcement for the drop center rim.

Figure 7 illustrates still another modification wherein the finishing rink 45 simulates in cross-sectional area the ornamental rings 25 and 31 hereinbefore described. In other words, the finishing ring 45 is provided at its inner and outer edges with marginal return-bent curved flanges 46 adapted to respectively engages the front side of the wall portions 22 of the rim and the inner surface of the annular shoulder 23 on the rim. The finishing ring 45 is secured to the front side of the rim in ubstantially the same manner as the finishing ring 40 described in the modification illustrated in Figure 6 except that instead of providing a bead on the inner surface of the shoulder 23, the latter is formed with a groove 47 within which the outer marginal flange 46 of the ring is adapted to seat. The arrangement is such that when it is desired to secure the ring 45 in position upon the rim, the outer marginal flange 46 is engaged within the groove 47 in the manner illustrated by the dotted line position of the ring shown in Figure 7. The ring is then fulcrumed about its engagement within the groove to move the inner portion thereof rearwardly past the peripheral portion of the same at which time the inner marginal flange 46 will snap into engagement with the front face of the rim.

The construction illustrated in Figure 8 differs from the foregoing modifications in that the finishing ring 50 is riveted or otherwise suitably secured to the front face of the wall portions 22 of the rim. In detail, washers 51 are secured to the portions 22 of the rim at circumferentially spaced points by the rivets 52 which, in addition, serve to secure the appearance ring in place. In a construction of the above type, it is preferable to employ rivets formed of substantially the same decorative material as the ring or to finish the forward ends of the rivets to correspond to the finish of the rim.

Figure 9 illustrates a further modification of the invention and differs from the construction illustrated in Figure 8 in that the finishing ring 55 is so designed as to permit the same to be riveted directly to the front faces of the portions 22 of the rim without the use of spacers or washers. As shown in Figure 9, the ring is provided with enlarged marginal edge portions 56 having surfaces corresponding to the portions of the front side of the rim with which they are adapted to engage and serve to space the intermediate portions of the ring laterally outwardly from the front side of the rim.

In Figure 10, we have shown a construction wherein both the tire retaining flange 24 and wall portions 22 are provided with ornamental rings. The rings are designated herein by the reference characters 57 and 58 and as will be observed are similar in construction to the appearance ring 55 described in connection with the modification illustrated in Figure 9. The rings 57 and 58 may be secured in any suitable manner to the flange portions 22 and 24, but as shown in Figure 10 are directly riveted to these flange portions by means of suitable rivets 59. The front faces of the rivets are so fashioned as to form in effect a continuation of the corresponding faces of the rings and in addition, are formed of substantially the same material so as not to detract from the appearance of the construction. The above appearance rings, in addition to enhancing the appearance of the rim, obviously function to reinforce the rim.

In Figure 11, we have illustrated a further modification wherein the reinforcing ring 60 corresponds to the exterior surfaces of the portions 22, 23 and 24 of the rim and is secured in abutting relation to the latter surfaces. While the ring 60 may be secured in position in any suitable manner, the same is preferably united in place by welding so as to provide a neat and pleasing appearance. It will be apparent from the nature of the ring 60 that the same may either be formed by a stamping operation or may be rolled from sheet steel.

In the above figure, we have shown a finishing ring 61 secured to the exterior surfaces of the rear tire retaining flange and annular shoulder. This latter ring is similar to the one just described with the exception that the portion of the ring 60 adjacent the wall section 22 is omitted. In this connection, it is to be understood that in any of the above modifications finishing rings may be secured to both the front and rear flanges if desired.

The modification illustrated in Figure 12 shows a finishing ring for the tire retaining flange only. This ring is illustrated in the above figure by the reference character 65 and as will be observed corresponds to the front face of the tire retaining flange 24 of the rim. While any suitable means may be provided for securing the ring 65 in place, we have shown the same as riveted directly to the flange by means of rivets 66 which are preferably arranged at circumferentially spaced points.

Figure 13 discloses a pair of rings 68 and 69 secured in any suitable manner directly to the front faces of the flange portions 22 and 24, respectively on the rim. The rim 69 may be of the same type as set forth in connection with the modification illustrated in Figure 12, if desired, and is preferably welded or otherwise united to the front face of the tire retaining flange 24. The ring 68, on the other hand, is preferably provided with a transversely curved front face and a substantially flat rear face adapted to be welded or otherwise suitably united to the front face of the flange portion 22. The arrangement is such that both of the above rings cooperate to impart an ornamental appearance to the vehicle wheel rim.

The modification illustrated in Figure 14 shows a pair of rims 70 and 71 having substantially flat front faces and having rear faces curved to correspond to the adjacent front face of the tire retaining flange and the connecting portions of the wall section 22 and annular shoulder 23. The appearance rings 70 and 71 may either be prefashioned from wire stock designated generally herein by the reference character 72 or may be formed in place by compressing the wire stock against the portions of the rim to which it is desired to secure the rings. The rings thus formed may be either welded or riveted in position as clearly shown in Figure 14.

The modification illustrated in Figure 15 shows a ring 80 of ornamental cross-sectional area secured to the front face of the wall section 22. The ring 80 may be secured in any suitable manner to the rim, such, for example, as by snapping the same in position in the manner clearly described in connection with the modification illustrated in Figure 6 or may be welded to the rim. In addition to the ring 80, the above modification suggests the provision of a second appearance ring 81 on the rear face of the rim. In the present instance, the ring 81 is suitably secured to the rear side of the rim at the juncture between the rear wall section 22 and the rear annular shoulder 23.

Figure 16 illustrates the drop center rim as provided with a pair of ornamental rings 85 and 86. The ring 85 is similar in construction to the ornamental ring 40 shown in Figure 6 and is preferably snapped into engagement with the rim opposite the side wall portion 22 in substantially the same manner as the aforesaid ring. The ring 86, on the other hand, is positioned upon the drop center rim opposite the tire retaining flange 24 as suggested by the dotted line position thereof and while this ring may be secured in place in any suitable manner, nevertheless, it is preferably snapped into engagement with the rim. In detail, the outer marginal edge of the ring 86 is engaged in the recess 87 formed by the outer edge of the tire retaining flange and the inner marginal edge of the ring is then moved radially inwardly toward the rim. As the inner marginal edge of the ring is moved inwardly beyond the outer marginal edge thereof, the same is snapped into engagement with the rim. As will be observed from Figure 16, the ring is of sufficient width that when in its assembled relation with the rim, the inner marginal edge thereof engages the outer edge portion of the ring 85 so as to cooperate with the latter to substantially conceal the front side of the rim. If desired, the above arrangement may be duplicated upon the rear side of the rim, with the result that the appearance of the latter is not only improved, but the sides of the same are materially reinforced. In other words, the rings 86 will function to brace the curled portions of the tire retaining flanges, while the rings 85 operate to brace the annular shoulders 23 against inward movement.

In Figure 17, we have shown a slightly different form of drop center rim which is designated generally in the above figure by the reference character 88. As shown, the drop center rim 88 is provided with a base 89 having substantially radially outwardly extending side walls 90 provided with laterally outwardly extending annular shoulders 91 offset as at 92 and terminating in curled tire retaining flanges 93. The offset portions 92 form inner and outer annular shoulders 94 and 95 respectively. The arrangement is such that the free ends of the curled tire retaining flanges engage the outer annular shoulders 94, while the inner shoulders 95 serve as an abutment for the outer marginal edge portions of suitable finishing rings 96. The finishing rings 96 are preferably similar in design to the rings 40 and 85, hereinbefore described, and are snapped into engagement with the rim in substantially the same manner as these latter rings. Thus, it will be observed that the finishing rings 96 will serve to brace the annular connecting shoulders 91 from inward movement and the curled tire retaining flanges are prevented from spreading by engagement with the abutment or shoulder 92. The foregoing construction is important since it not only enhances the appearance of the rim, but provides for effectively reinforcing the side walls of the latter so as to permit the same to support the entire weight of the vehicle without the danger of the side walls collapsing or the ends of the curled tire retaining flanges of moving inwardly and pinching the tire.

While in describing the present invention particular stress has beeen placed upon the association of the various finishing rings specified above with vehicle wheel rims of the drop center type, it should be understood that these rings or their equivalent may be employed with equal facility upon other types of vehicle wheel rims and accordingly, the application of these rings should not be construed as limited to drop center rims. It should further be understood that while several modifications of the invention have been set forth herein with some particularity, the advantageous features of the invention may be secured by various other modifications and accordingly, reservation is made to make such changes in the various constructions as may come within the purview of the accompanying claims.

What we claim as our invention is:

1. A vehicle wheel rim having an outwardly extending annular flange portion, a fastener member secured to the exterior face of said flange portion, and a continuous ring having a snap engagement with said fastener member.

2. A vehicle wheel rim having an outwardly extending annular flange portion, a metallic strip secured to the exterior face of the flange portion and having the marginal edges thereof spaced laterally from the adjacent surfaces of the flange portion, and a ring having marginal flanges at the inner and outer edges thereof extending over the aforesaid marginal portions of the metallic strip for securing the ring to the rim.

3. A vehicle wheel rim of the drop center type having outwardly extending annular side wall portions and having annular tire engaging flange portions extending beyond the wall portions and connected to the latter, washers secured to the exterior face of one of the aforesaid portions at circumferentially spaced points and having the marginal edges thereof spaced laterally outwardly from the last-mentioned portions, and a ring having marginal flanges at the inner and outer edges thereof adapted to snap over the marginal edges aforesaid of the washers for securing the ring to the rim.

4. A vehicle wheel rim having an outwardly extending annular flange portion, a member secured to the exterior face of said flange portion and having undercut inner and outer marginal edge portions, and a ring concealing said member and having marginal flanges adapted to be bent into engagement with the undercut portions of said member for securing the ring to the rim.

5. A vehicle wheel rim having an outwardly extending annular side flange portion, a member secured to the exterior face of the flange portion and having the inner and outer marginal edges thereof spaced laterally outwardly from the flange portion, and a transversely split ring having marginal flanges at the inner and outer edges thereof adapted to receive the marginal edges aforesaid of said member for securing the ring to the rim.

6. A vehicle wheel rim having an outwardly extending annular portion, a fastener member secured to the exterior face of said annular portion, and a ring having a snap engagement with said fastener member.

7. A vehicle wheel rim having an outwardly extending annular flange portion provided with a laterally extending tire engaging flange portion, and a ring bowed outwardly with respect to the exterior face of the first named flange portion and extending diagonally from a point on the tire engaging flange portion spaced laterally from the aforesaid flange portion to a point on the latter adjacent the inner edge of the same.

8. A vehicle wheel having an outwardly extending flange portion provided with a laterally extending flange portion, and a ring bowed outwardly with respect to the exterior face of the outwardly extending flange and extending diagonally from a point on the tire engaging portion spaced laterally from the aforesaid outwardly extending flange to a point on the latter adjacent the inner edge of the same, said ring held in assembled relation with the rim solely by the engagement of the marginal edges thereof with the rim.

9. The combination with a drop center rim, of a member secured to an outer side wall of the drop base portion of said rim and an ornamental ring secured to said member.

10. The combination with a drop center rim, of a member secured to an outer side wall of the drop base portion of said rim and a channel shaped ornamental ring resiliently secured to said member.

LEONARD J. ROSA.
CHARLES S. ASH.